United States Patent [19]

Ashworth

[11] Patent Number: 5,458,659
[45] Date of Patent: Oct. 17, 1995

[54] DESULFURIZATION OF CARBONACEOUS FUELS

[75] Inventor: Robert A. Ashworth, Wooster, Ohio

[73] Assignee: Florida Power Corporation, St. Petersburg, Fla.

[21] Appl. No.: 139,455

[22] Filed: Oct. 20, 1993

[51] Int. Cl.⁶ .................................................. C10L 9/12
[52] U.S. Cl. ............................... 44/622; 44/624; 44/625; 208/404; 208/410; 208/411
[58] Field of Search ................................. 208/400, 404, 208/405, 410, 411; 48/202, 210; 44/622, 624, 625

[56] References Cited

U.S. PATENT DOCUMENTS

| | | | |
|---|---|---|---|
| 4,395,975 | 8/1983 | Ashworth et al. | 122/5 |
| 4,423,702 | 1/1984 | Ashworth et al. | 122/5 |
| 4,624,409 | 11/1986 | Takeda et al. | 239/11 |
| 4,801,438 | 1/1989 | Najjar et al. | 48/202 |

Primary Examiner—Bekir L. Yildirim
Attorney, Agent, or Firm—Herbert W. Larson

[57] ABSTRACT

First, nitrogen oxides are reduced by firing coal in substoichiometric air conditions in a first stage oxidation unit of a combustor to reduce $NO_x$ from fuel bound nitrogen. Hydrated lime, $Ca(OH)_2$, is introduced into the first stage oxidation unit to produce calcium sulfide. The calcium sulfide becomes tied up in a slag eutectic which is removed prior to entry of the fuel gas to a second stage oxidation unit at the entrance of a furnace where additional preheated air is added to the fuel gas.

20 Claims, 5 Drawing Sheets

DESULFURIZATION OF CARBONACEOUS FUELS

BACKGROUND OF THE INVENTION

1. Field of The Invention

This invention relates to a method for the desulfurization of carbonaceous fuels. More particularly, it refers to an improved method for removing sulfur through the use of alkali sorbents in a combustion process and for the reduction of nitrogen oxides and particulate emissions from the combustion of coal.

2. Description of The Prior Art

U.S. Pat. Nos. 4,395,975 and 4,423,702 describe methods for capturing sulfur in an alkaline molten slag produced from the partial oxidation of coal and reducing emissions of nitrogen oxides and particulate from the coal combustion process. These methods accomplish their intended purpose, but do not remove all the sulfur and nitrogen oxides.

Further research has continued on the development of processes to provide low capital and operating cost cleanup alternatives for utilities and industries currently burning coal. An improved process is needed that will accomplish these results.

SUMMARY OF THE INVENTION

I have discovered a more economical process employing a coal combustor to reduce $No_x$ and further remove sulfur and slag in the combustor itself to reduce the quantity of pollutants entering a coal fired furnace.

Alkali compounds, such as limestone, lime, hydrated lime, dolomite, trona, nacholite, potassium carbonate or combinations thereof are added with coal being fired in a first stage oxidation unit of a combustor, or are added separately into the first stage.

High levels of sulfur capture are achieved in an alkali molten slag produced from the partial oxidation of the coal by incorporating a combustor design insuring that all of the oxygen from the oxidizing media (air, oxygen or a combination thereof) is completely consumed prior to entering the alkaline molten slag sulfur capture zone.

Nitrogen oxides are reduced by firing the coal in sub-stoichiometric air conditions in the first stage to reduce $NO_x$ produced from fuel bound nitrogen. Slight inter-cooling prior to the second stage of combustion reduces the second stage combustion temperature, thereby reducing thermal $NO_x$ production.

In a second stage oxidation unit at an entrance to a furnace heated combustion air is mixed slowly with the fuel gases from the first stage. Slow mixing, in conjunction with flame radiation cooling in the furnace proper reduces localized oxidation zone temperatures. Thermal $NO_x$ production is reduced because thermal $NO_x$ production decreases with decreasing flame temperature.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
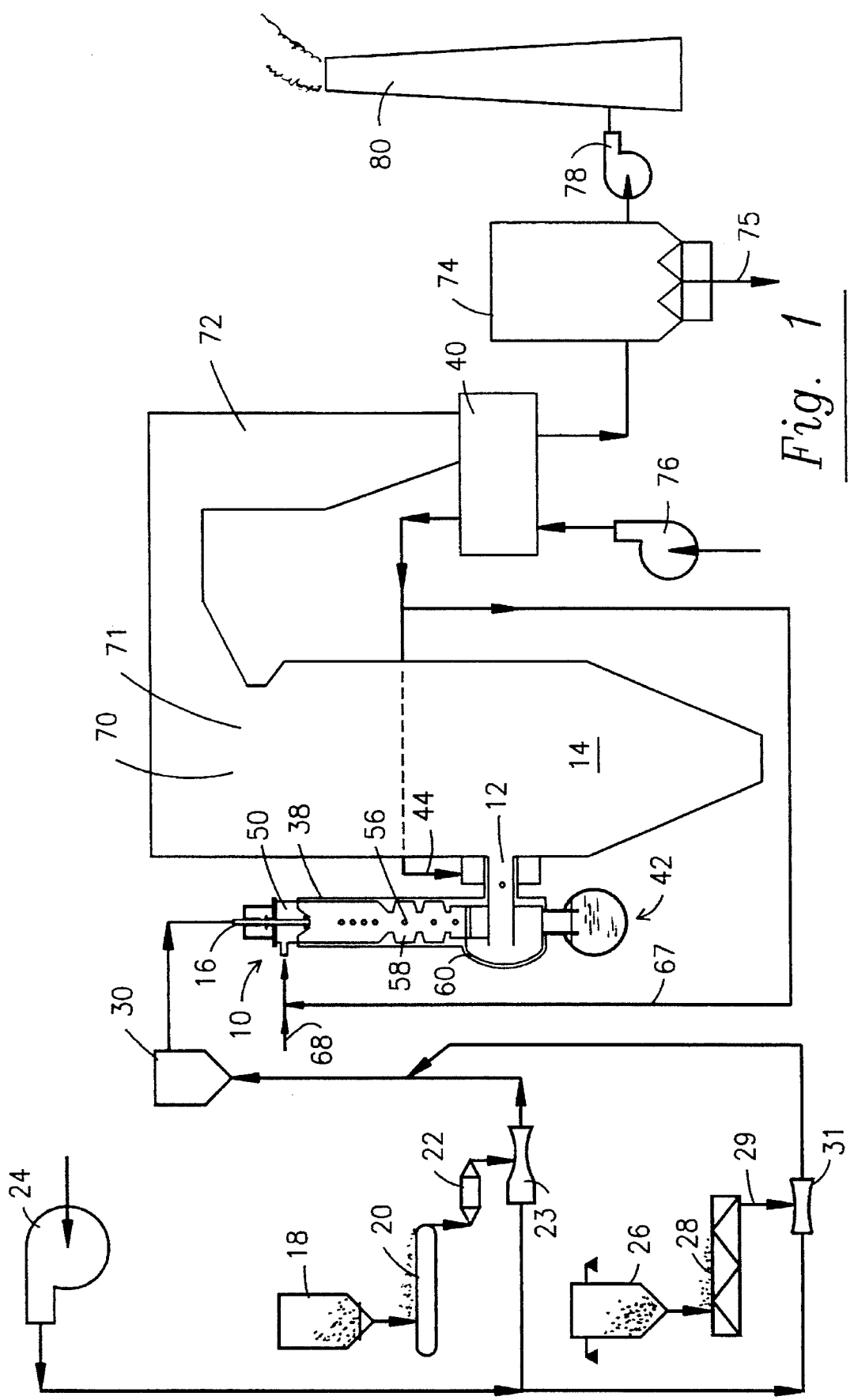
FIG. 1 is process flow diagram describing the coal desulfurizing method of this invention.

Throughout the following detailed description, the same reference numerals refer to the same elements in all figures.

To achieve high sulfur capture, the combustor is designed to provide for 1) adequate residence time of the partial oxidation gases at temperature prior to entering an alkaline molten slag-fuel gas disengaging zone, and 2) intimate fuel/air mixing, done in such a way as to eliminate the formation of localized pockets of unreacted oxygen. If these two objectives are achieved, sulfur may be captured by the alkali, in accord with the following example reaction:

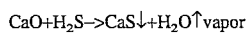

(CaS in a molten eutectic with other slag compounds)

If all of the available oxygen is not consumed prior to the partial oxidation gases leaving the alkaline molten slag-fuel gas disengaging zone any sulfur captured by the alkali will be released as diatomic sulfur, $S_2$. The way that $S_2$ forms in the first stage is primarily in accord with the following reaction:

(CaO in a molten eutectic with other slag compounds)

Figure 5:
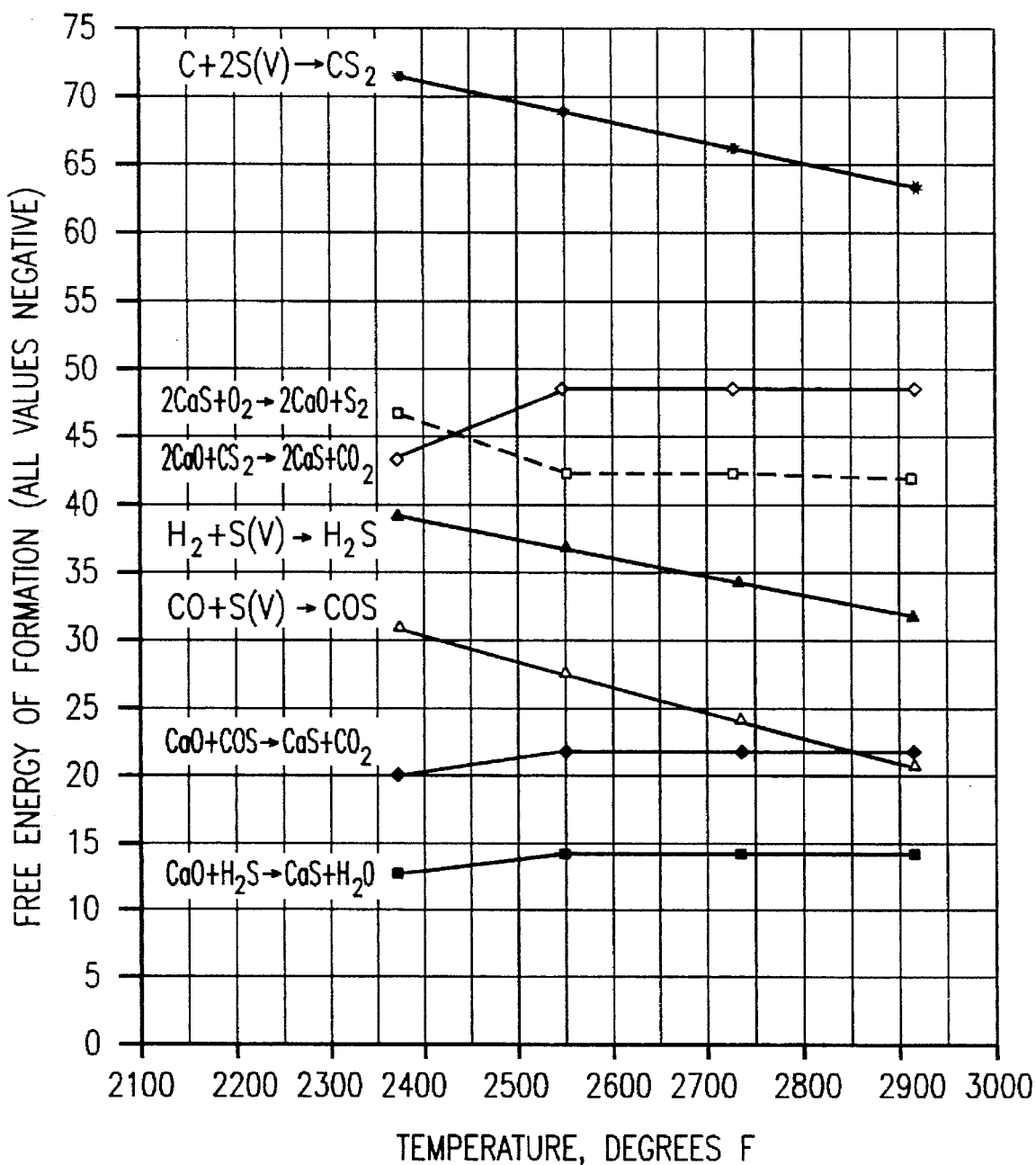
FIG. 5 shows the free energies of formation versus temperature for the important thermochemical reactions taking place in the first stage of combustion.

Molten alkali will capture sulfur under reducing conditions, but if localized oxygen pockets, in the reducing fuel gas from the coal combustion zone, come into intimate contact with the alkali sulfides, the sulfur will be released from the alkali in the form of diatomic sulfur. See the free energies of formation for these reactions in FIG. 5. The more negative the free energy of formation of a reaction, the more likely the reaction will occur.

With the more reactive alkali, calcium hydroxide (hydrated lime), sulfur is captured at a faster rate than that when using calcium carbonate (limestone). See FIG. 3. From a design standpoint, this means that residence time under reducing conditions is a critical design parameter. Also a critical parameter is the design of the fuel/air nozzles. They must be designed in such a manner as to provide intimate contact of fuel and air, but yield no oxygen pockets within the reducing gases produced at the point of contact in the sulfur capture alkali molten slag zone. The combustor design that takes into account these critical design parameters is discussed below.

In the example shown in the FIG. 1 schematic, combustor 10 is located in front of the entry 12 into the furnace 14. An opening 16 into the combustor receives pulverized coal. A pulverized coal bin 18 supplies coal via a conveyor belt 20 to a pulverizer 22. Air from a transport air blower 24 is mixed with the coal in a venturi eductor 23 and pneumatically conveyed to a solids mixer/splitter 30. Alkali, such as hydrated lime [Ca(OH)$_2$] is supplied from bin 26 via conveyor 28 to a transport line 29 where air from the transport air blower 24 is mixed with the hydrated lime in a venturi eductor 31. Other alkali that can be employed are lime, limestone, dolomite, nacholite, potassium carbonate and trona. The pulverized coal and hydrated lime are thoroughly mixed in the mixer/splitter 30 and then are delivered to opening 16 in the combustor 10. Controlled partial oxidation of the coal takes place in the combustor 10 by regulation of the preheated air flow 67 from air blower 76 through the air preheater device 40.

Optionally the hydrated lime could be separately admitted into the combustor 10 at point 56. In another option, the injection of steam 68 into the combustor 10 is used to enhance sulfur capture. The steam is added at a 0.1 to 0.3 steam to fuel weight ratio.

The products of partial combustion and the molten slag from the ash portion of the coal plus the inorganic alkali compounds are separated in a cyclone chamber 60, and a molten slag eutectic 34 containing calcium sulfide and other alkali sulfides from reaction with alkali compounds in the coal ash are collected at the bottom opening 36 of the combustor 10. The molten slag is quenched in a water quench sluice system 42 and the ash is sluiced to a settling pond.

The combustor 10 has a water jacket 38 surrounding the combustion zone or first stage oxidation unit 48 where a jet mixing at about 2200 to 2600 degrees F. provides intimate contact between the coal partial oxidation gases with the hydrated lime and coal ash. The hot gaseous products leave the combustor 10 at exit 12 into the boiler furnace 14. The water jacket 38 designed as a jacket or as waterwall tube construction cools the gases slightly so that upon combustion with secondary air 44, the flame temperature is reduced, bringing with it a reduction in thermal $NO_x$ production. Secondary air 44, from air blower 76, through air preheater 40 is admitted into the furnace entrance 12 to yield slow mixing of fuel gas with hot air. The preheated air is introduced into the furnace entrance 12 to achieve an overall air to fuel stoichiometric ratio of 1.05 to 1.25. With slow mixing less localized hot zones occur which would produce higher levels of $NO_x$ emissions from the furnace 14. Through the use of combustor 10, a high percentage (75–80%) of the molten slag produced during partial oxidation of the coal is removed from the gas prior to entry into the furnace 14, and prior to second stage combustion at entry 12.

Flue gas from the combustor rises up through the radiant section of the furnace 14, passes through steam superheaters 70 and 71, through an economizer 72, through an air heater 40 and into a particulate removal device 74 such as a bag house or electrostatic precipitator. Any oxidized alkali sulfur compounds which formed in the furnace will be removed in the particulate removal device stream 75. Flue gas from the particulate removal device 74 is drawn from the system by an induced draft fan 78 and is exhausted into an atmospheric stack 80.

Figure 2:
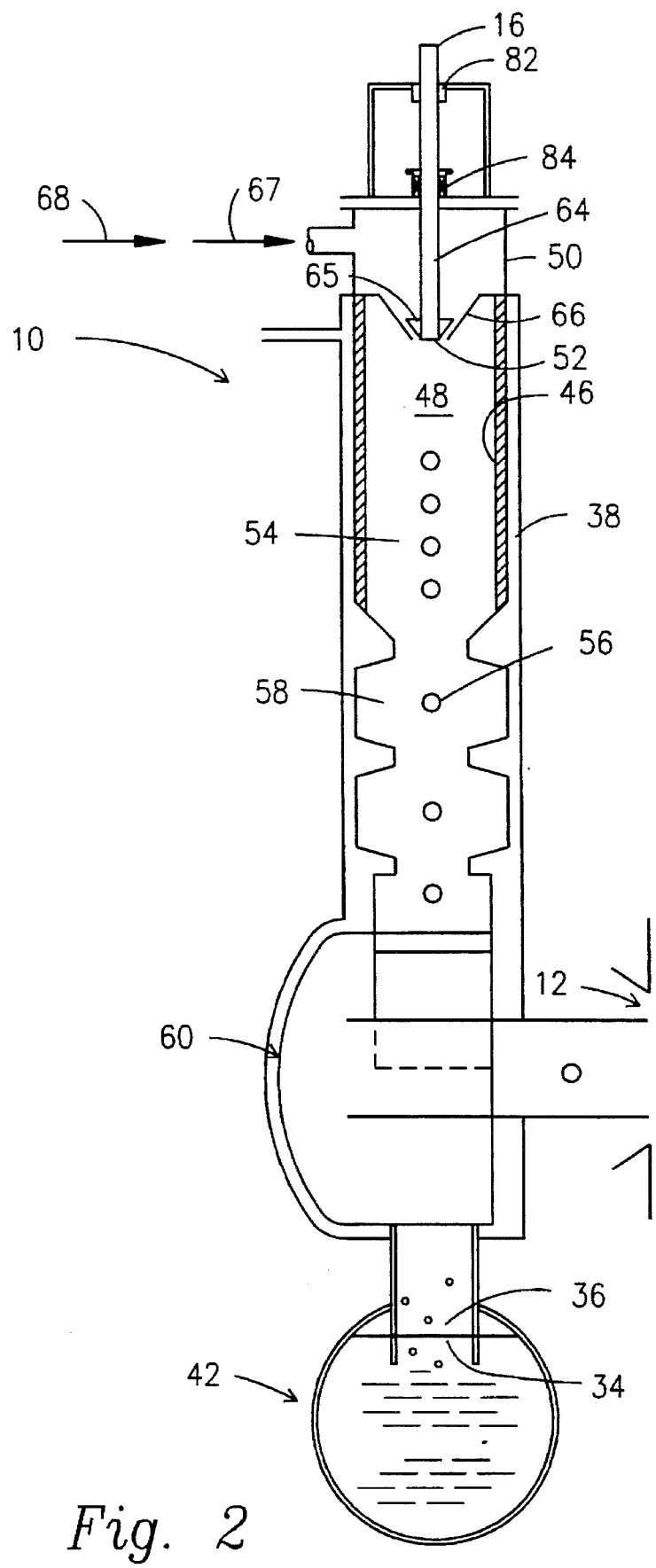
FIG. 2 is a pictorial description of the combustor apparatus used for initial coal desulfurizing.

The combustor 10, shown in FIG. 2, has a gasification section 54, a hydrated lime injection point 56, a gas-slag mix section 58, and a slag separation section 60. The molten slag from the combustor is quenched and sliced away via the water quench/slice system 42. The first stage oxidation unit 48 of the combustor is internally refractory lined 46 with an outer water jacket 38 or with water wall tubes to keep outer metal walls cool.

The residence time required to consume all of the oxygen from an air media fired staged combustor, with a proper fuel/air nozzle design is 0.05 to 0.4 seconds, and preferably 0.1 to 0.25 seconds. This is accomplished by designing a combustor partial oxidation chamber of sufficient volume that the residence time requirement is met prior to entry into the gas-slag mix section.

Figure 4:
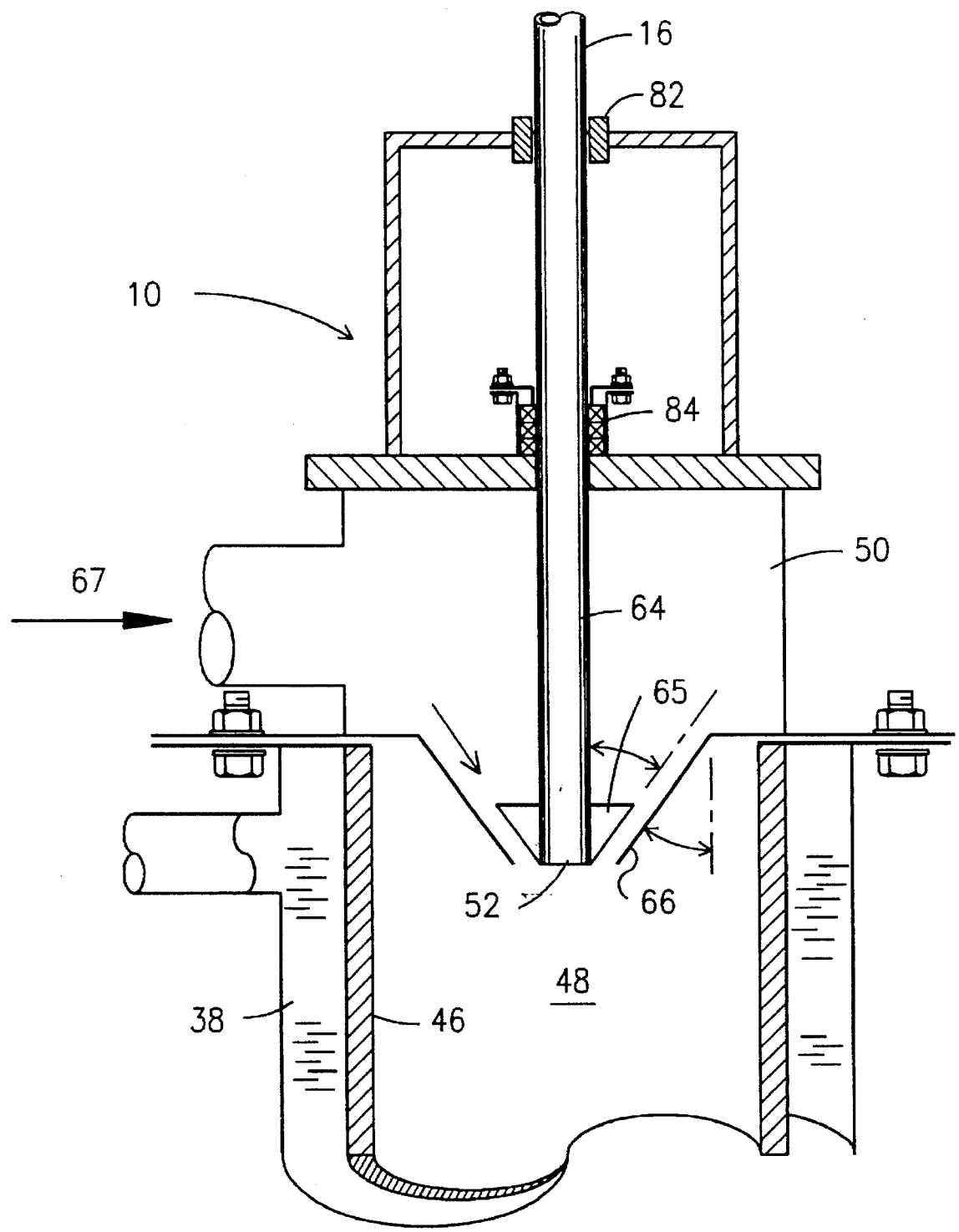
FIG. 4 is a pictorial description of the coal-primary air nozzle within the combustor apparatus.

The coal/primary air nozzle shown in FIG. 4 is designed to eliminate air swirl during partial oxidation of the carbonaceous fuel. With air swirl, there is a greater chance of creating localized oxygen pockets within the reducing gases produced from the partial oxidation of the coal.

Preheated primary air 67, with or without steam 68 addition to the air, enters the combustor 10 preheat air chamber 50 and is directed around an outer annulus with a 30 degree angle cone 66 that forces the air 67 into the concentrically fired coal stream 64. The coal pipe 16 has a 30 degree angle cone 65 at the exit 52 that is controlled by vertical positioning of the coal pipe through a top guide 82 plus packing arrangement 84 to maintain set air velocities through the annulus with changing coal feed/preheat air flow rates. The air to fuel stoichiometric ratio in the first stage oxidation unit 48 is 0.55 to 0.8 and preferably 0.6 to 0.7.

The coal pipe 16 outlet nozzle can be designed with or without internal swirl vanes but with no swirl vanes in the outer annulus air entry. The converging cones 65 on the coal pipe 16 and outer annulus air pipe that forces the air 67 into the fuel stream could have angles of 15 degrees to 60 degrees from the vertical, but preferably has angles of about 25 degrees to 45 degrees. The coal partial oxidation takes place in a water jacketed 38 and refractory lined 46 combustor 10 located at the exit 52 of the coal/air nozzles seen in FIG. 4.

Figure 3:
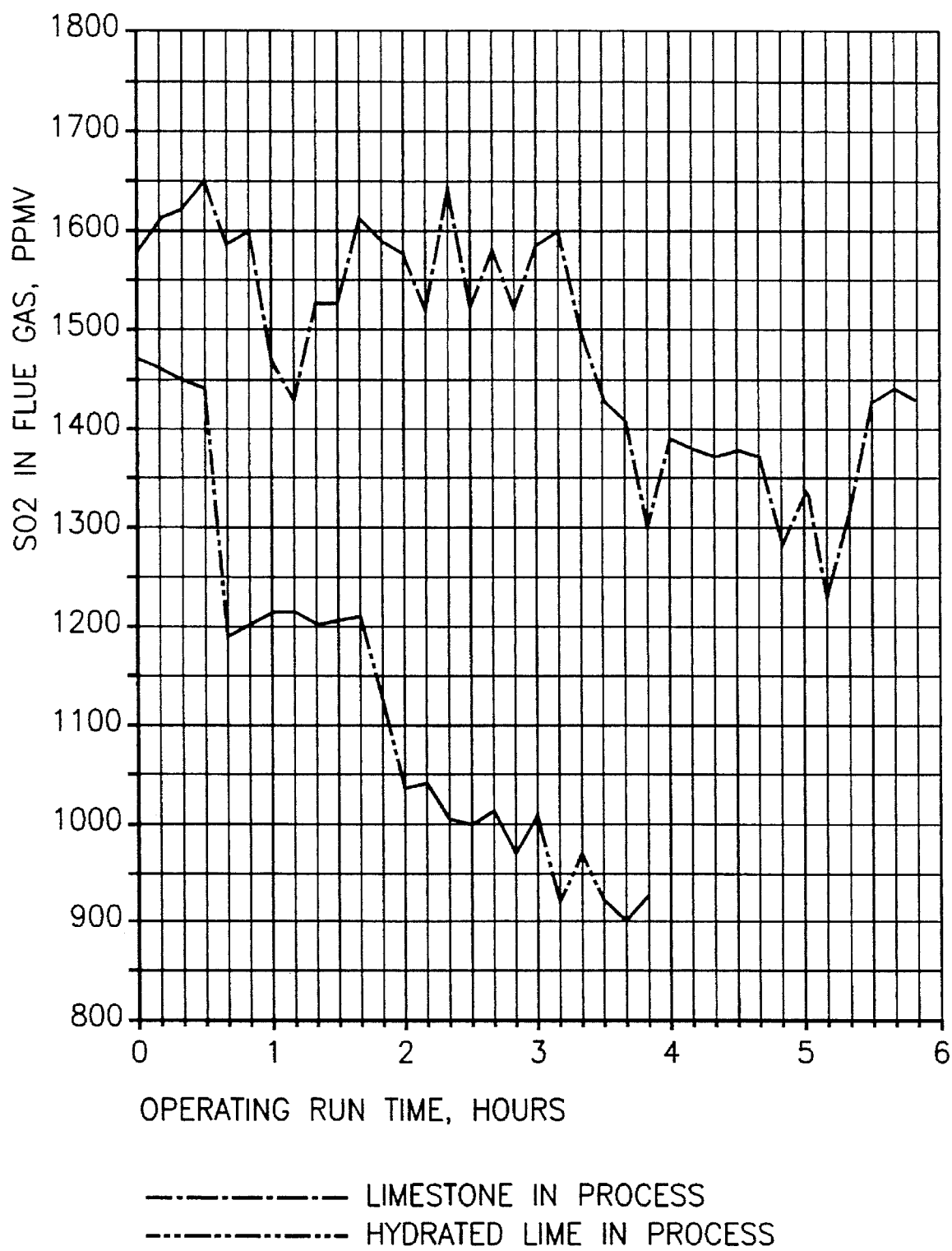
FIG. 3 is a graph comparing the increased ability of hydrated lime versus limestone of the prior art to remove sulfur from coal in the process of this invention.

The difference and substantial improvement between employing the present process incorporating the hydrated lime as the alkali over limestone is shown in FIG. 3.

The following examples show the improvement results when hydrated lime is employed:

|  | EXAMPLE 1 | EXAMPLE 2 |
|---|---|---|
| COAL: | | |
| Feed Rate, Lb/hr | 834 | 856 |
| Feed Rate, MM Btu/hr* | 10.4 | 10.8 |
| Sulfur (as fed), wt % | 2.47 | 2.69 |
| ALKALI: | | |
| Type | CaCO3 | Ca(OH)2 |
| Feed Rate, lb/hr | 64 | 47 |
| Ca/S Molar Ratio | 0.97 | 1.1 |
| AIR: | | |
| 1st State Stoichiometry, Vol. % | 66.5 | 62.8 |
| 1st + 2nd Stage Stoichiometry, Vol % | 120.8 | 118.0 |
| STEAM: | | |
| lb Steam/lb coal | 0–0.25 | 0.25 |
| COMBUSTION: | | |
| Carbon Conversion, wt % | 96.9 | 96.8 |
| PARTICULATE: | | |
| 1st State Removal, wt % | 37.4 | 22.6 |
| Cyclone Removal, wt % | 34.3 | 23.6 |
| Left in Flue Gas, wt % | 28.3 | 53.8 |
| SULFUR CAPTURE: | | |
| Molten Slag, wt % | 1.34 | 2.61 |
| Cyclone Particulate, wt % | 15.13 | 11.15 |
| Fine Particulate**, wt % | 14.53 | 30.94 |
| Overall, wt % | 31.00 | 44.70 |
| 1st STAGE FUEL GAS***: | | |
| H2S, ppmv | 750–1700 | 0 |
| SO2, ppmv | 1000–1500 | 0 |
| CS2, ppmv | 16 | 0 |
| $NO_x$ | 100–700 | 100 |

-continued

|  | EXAMPLE 1 | EXAMPLE 2 |
|---|---|---|
| NH3, ppmv | 0 |  |
| NO$_x$ as (NO2) from 2nd Stage. lb/MM Btu | 0.34 | 0.36 |

*Based on dry coal
**By Difference
***Measured with Draeger Tubes

Having thus described the invention, what is claimed and desired to be secured by Letters Patent is:

1. A method for desulfurization of a carbonaceous fuel, the steps comprising
   (a) introducing the carbonaceous fuel containing sulfur and nitrogen into a water jacketed combustor having a first stage partial oxidation unit,
   (b) introducing an alkali into the first stage partial oxidation unit,
   (c) passing preheated air through an annular conical nozzle concentric to an exit end of an inner fuel feed pipe within the combustor, the pipe containing the carbonaceous fuel, to rapidly mix with and partially oxidize the carbonaceous fuel at the exit end of the inner fuel feed pipe, so that air swirl is not imparted to the preheated air in the first stage partial oxidation unit,
   (d) maintaining a resulting fuel gas-alkali molten slag mixture in the first stage partial oxidation unit for a period long enough to insure complete consumption of air to facilitate the capture of sulfur as alkali sulfides and to reduce the formation of nitrogen oxides from the carbonaceous fuel,
   (e) separating the molten slag from the fuel gas in a water quench system to solidify the molten slag containing alkali sulfides to inhibit hydrolysis and preclude liberation of sulfur from the alkali, and
   (f) routing the fuel gas to a second stage oxidation unit at an entrance to a furnace of a boiler, together with additional preheated air to completely combust the fuel gas as it enters the furnace.

2. The method according to claim 1 wherein the alkali introduced in the first stage partial oxidation unit is selected from the group consisting of lime, hydrated lime, limestone, dolomite, nacholite, potassium carbonate and trona.

3. The method according to claim 2 wherein the alkali is hydrated lime.

4. The method according to claim 1 wherein the carbonaceous fuel and alkali are mixed together before introducing them into the first stage partial oxidation unit.

5. The method according to claim 1 wherein the carbonaceous fuel and alkali are separately introduced into the first stage partial oxidation unit.

6. The method according to claim 1 wherein the air to fuel stoichiometric ration in the first stage partial oxidation unit is 0.55 to 0.8.

7. The method according to claim 6 wherein the air to fuel stoichiometric ratio is 0.6 to 0.7.

8. The method according to claim 1 wherein the preheated air is directed through the annular conical nozzle mounted at an angle of 15 degrees to 60 degrees relative to the inner fuel pipe axis.

9. The method according to claim 8 wherein the annular conical nozzle is mounted concentric with the exit end of the fuel pipe at an angle of 25° to 45° relative to the inner fuel pipe axis.

10. The method according to claim 1 wherein steam is passed with the preheated air into the first partial stage oxidation unit to enhance sulfur capture.

11. The method according to claim 10 wherein the steam is added at a 0.1 to 0.3 steam to fuel weight ratio.

12. The method according to claim 1 wherein the fuel gas and molten slag mixture is retained in the first stage partial oxidation unit for 0.05 to 0.4 seconds to permit the alkali compounds to react and capture liberated carbonaceous fuel sulfur compounds.

13. The method according to claim 1 wherein the additional preheated air is introduced into the furnace at a stoichiometric air to fuel ratio of 1.05 to 1.25 through two concentric zones around the inner fuel gas exit pipe to provide lower NO$_x$ emissions.

14. A method for desulfurization of coal containing sulfur, the method comprising
   (a) introducing the coal and an alkali in a pulverized form into a first stage partial oxidation unit, the alkali selected form the group consisting of lime, hydrated lime, limestone, dolomite, nacholite, potassium carbonate and trona,
   (b) passing preheated air through an annular conical nozzle concentric with an inner pipe within the partial oxidation unit, the inner pipe containing coal and directing the preheated air into a stream of the coal leaving an exit end of the pipe to rapidly mix and partially oxidize the coal at the end of the pipe so that swirl is not imparted to the preheated air in the first stage partial oxidation unit,
   (c) maintaining a resulting fuel gas-alkali molten slag mixture in the first stage partial oxidation unit for a period long enough to insure complete consumption of air to capture sulfur as alkali sulfides and to reduce the formation of nitrogen oxides from the coal,
   (d) separating the molten slag from the fuel gas in a water quench system within the partial oxidation unit to solidify the slag to inhibit hydrolysis and preclude the liberation of sulfur from the alkali, and
   (e) routing the fuel gas to a second stage oxidation unit at an entrance to a furnace of a boiler, together with additional preheated air to completely combust the fuel gas as it enters the furnace.

15. The method according to claim 14 wherein the alkali is hydrated lime.

16. The method according to claim 14 wherein the coal and alkali are separately introduced into the first stage oxidation unit.

17. The method according to claim 14 wherein the coal and alkali are introduced into the first stage oxidation unit mixed together.

18. The method according to claim 14 wherein the air to fuel stoichiometric ratio in the first stage oxidation unit is 0.55 to 0.8.

19. The method according to claim 14 wherein the annular conical nozzle receives preheated air which is introduced into the coal as it exits from an end of the coal feed pipe at an angle of 15° to 60° relative to the inner pipe axis and the preheated air is mixed with the coal after passing through the annular conical nozzle.

20. The method according to claim 19 wherein steam is mixed with the air prior to contact with the coal.

* * * * *